(12) United States Patent
Malone et al.

(10) Patent No.: US 12,462,897 B2
(45) Date of Patent: Nov. 4, 2025

(54) METHOD AND SYSTEM OF TARGETING EPITOPES FOR NEOANTIGEN-BASED IMMUNOTHERAPY

(71) Applicant: NEC CORPORATION, Tokyo (JP)

(72) Inventors: Brandon Malone, Dossenheim (DE); Kousuke Onoue, Kanagawa (JP); Yoshiko Yoshihara, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 398 days.

(21) Appl. No.: 17/281,707

(22) PCT Filed: Nov. 20, 2019

(86) PCT No.: PCT/EP2019/081960
§ 371 (c)(1),
(2) Date: Mar. 31, 2021

(87) PCT Pub. No.: WO2020/104539
PCT Pub. Date: May 28, 2020

(65) Prior Publication Data
US 2021/0391031 A1    Dec. 16, 2021

Related U.S. Application Data

(60) Provisional application No. 62/770,220, filed on Nov. 21, 2018.

(51) Int. Cl.
*G16B 20/20*    (2019.01)
*G16B 20/30*    (2019.01)
(Continued)

(52) U.S. Cl.
CPC ............. *G16B 20/20* (2019.02); *G16B 20/30* (2019.02); *G16B 30/10* (2019.02); *G16B 40/20* (2019.02)

(58) Field of Classification Search
CPC ........ G16B 20/20; G16B 20/30; G16B 30/10; G16B 40/20
See application file for complete search history.

(56) References Cited

U.S. PATENT DOCUMENTS

| 11,222,711 B2 | 1/2022 | Sahin et al. |
| 2016/0092557 A1* | 3/2016 | Stojanovic ............ G06F 16/248 707/723 |
| 2021/0284738 A1* | 9/2021 | Yang ..................... G16B 20/00 |

FOREIGN PATENT DOCUMENTS

| CN | 105451759 A | 3/2016 |
| CN | 106687952 A | 5/2017 |

(Continued)

OTHER PUBLICATIONS

Communication, dated May 10, 2022, issued by the Japanese Patent Office in counterpart Japanese Application No. 2021-519744.
(Continued)

*Primary Examiner* — Larry D Riggs, III
*Assistant Examiner* — Emilie A Neulen
(74) *Attorney, Agent, or Firm* — Sughrue Mion, PLLC

(57) ABSTRACT

A method of ranking epitopes derived from neoantigens as targets for personalized immunotherapy includes collecting candidate epitopes based on patient data of a cancer patient. A set of scores are calculated for each of the candidate epitopes, each of the scores in a respective one of the sets for a respective one of the candidate epitopes representing an independent measure of a likelihood of the respective one of candidate epitopes to elicit an immune response in the cancer patient. The scores in each of the sets of scores are combined into a single score for each of the candidate epitopes. The single scores for the candidate epitopes in each case reflect an overall likelihood of eliciting the immune response in the patient. The candidate epitopes are ranked using the single scores for the immunotherapy.

6 Claims, 3 Drawing Sheets
Specification includes a Sequence Listing.

(51) Int. Cl.
*G16B 30/10* (2019.01)
*G16B 40/20* (2019.01)

(56) References Cited

FOREIGN PATENT DOCUMENTS

| JP | 2016521128 A | 7/2016 |
| WO | 2014/180490 A1 | 11/2014 |
| WO | 2018/183980 A2 | 10/2018 |

OTHER PUBLICATIONS

Jokinen, et al., "Determining epitope specificity of T cell receptors with TCRGP" bioRexiv (https : //www.biorxiv. org/content/10.1101/542332v2. full.pdf), Aug. 21, 2019, 17 pages.

Anne-Mette Bjerregaard, et al., "MuPeXI: prediction of neo-epitopes from tumor sequencing data", Cancer Immunol. Immunother., 2017, 66(9): 1123-1130.

X. Shirley Liu et al., "Applications of Immunogenomics to Cancer", Cell, 2017, 168(4): 600-612.

Qiang Gong et al., "Assessment of T-cell receptor repertoire and clonal expansion in peripheral T-cell lymphoma using RNA-seq data", Scientific Reports, 2017, vol. 7, No. 1, 10 pages.

International search report for PCT/EP2019/081960, dated Mar. 20, 2020.

Communication, dated Jul. 24, 2022, issued by the Intellectual Property Office of Singapore in Application No. 11202102582T.

Medgenome Inc., "OncoPeptVAC™ accurately predicts neoantigens from tumors using a novel HLA-peptide-TCR-binding algorithm", Aug. 25, 2018, pp. 1-4 (4 pages total).

Chen Min, et al., " Integration of 5G Mobile Caching and Big Data 5G Mobile Caching, Communication and Computing," Huazhong University of Science & Technology Press, Apr. 30, 2018, pp. 195-196 (8 pages).

Chinese Office Action dated Oct. 28, 2023 in Application No. 201980064547.9.

* cited by examiner

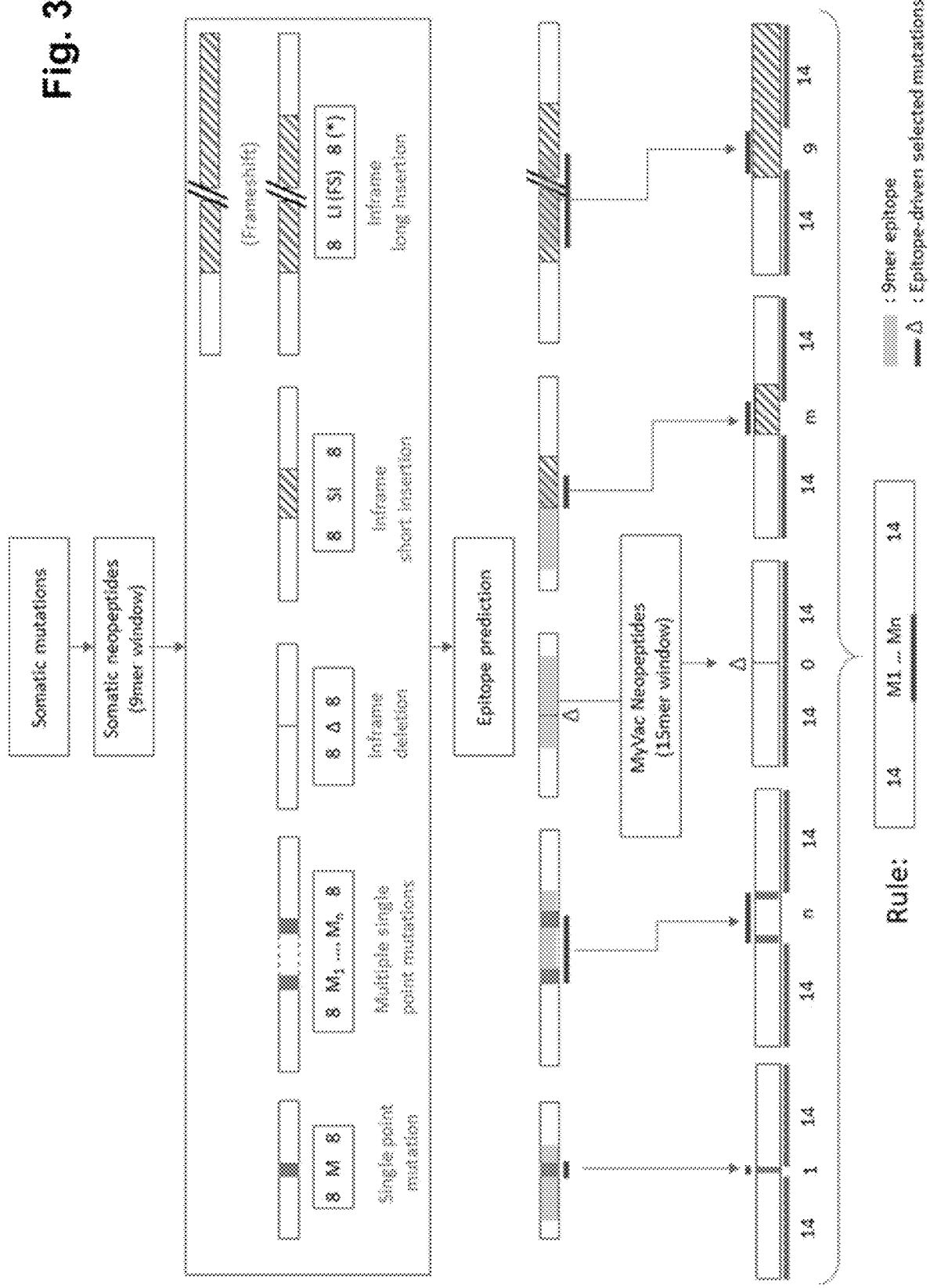

SEQUENCE LISTING

<160> NUMBER OF SEQ ID NOS: 2

<210> SEQ ID NO 1
<211> LENGTH: 4
<212> TYPE: PRT
<213> ORGANISM: Artificial Sequence
<220> FEATURE:
<223> OTHER INFORMATION: Synthetic peptide sequence

<400> SEQUENCE: 1

Ala Gly Thr Trp
1

<210> SEQ ID NO 2
<211> LENGTH: 4

```
<212> TYPE: PRT
<213> ORGANISM: Artificial Sequence
<220> FEATURE:
<223> OTHER INFORMATION: Synthetic peptide sequence

<400> SEQUENCE: 2

Pro Leu Lys Lys
1
```

METHOD AND SYSTEM OF TARGETING EPITOPES FOR NEOANTIGEN-BASED IMMUNOTHERAPY

CROSS-REFERENCE TO PRIOR APPLICATION

This application is a National Stage of International Application No. PCT/EP2019/081960, filed Nov. 20, 2019, which claims the benefit of U.S. patent application Ser. No. 16/392,658, filed Apr. 24, 2019, and which claims the benefit of U.S. Provisional Patent Application No. 62/770,220, filed on Nov. 21, 2018, the entire disclosure of which is hereby incorporated by reference herein.

FIELD

The present invention relates to a computerized method and system for determining the likelihood that different neoantigens will elicit an immune response in a particular patient, in particular, for neoantigen-based immunotherapy.

BACKGROUND

Cancer cells often include changes in deoxyribonucleic acid (DNA), referred to as neoantigens, which are not present in normal, healthy cells. Because neoantigens are not present in healthy cells, they are an attractive target for cancer therapy. In immunotherapy, the goal is to stimulate the patient's immune system to attack and kill the cancerous cells. In neoantigen-based immunotherapy, the goal is to teach the immune system to specifically target neoantigens. Since healthy cells do not include the neoantigens, such therapies offer the hope to avoid off-target or auto-immune responses.

Embodiments of the present invention consider the neoantigens as changes in DNA which are transcribed into messenger ribonucleic acids (mRNAs) according to principles of molecular biology and carry incorrect information. These mRNAs are then translated into malformed proteins. In other words, the neoantigens result in peptide sequences (proteins) which have incorrect amino acids. These proteins are then handled by one of two antigen-processing pathways: the endogenous processing pathway or the exogenous processing pathway. These pathways are discussed by Alberts, B., et al., "Molecular Biology of the Cell," Garland Science (2002), which is hereby incorporated herein by reference in its entirety.

In the endogenous processing pathway, the protein remains within the cell in which it was synthesized. The protein is chopped into small peptide sequences, also referred to as epitopes, of around 9 amino acids by the proteasome. Some of the epitopes are then transported to the endoplasmic reticulum (ER) for processing. In the ER, some of the epitopes bind to the major histocompatibility complex I protein (MHC-I). This epitope-MHC-I complex is presented on the cell surface. Thus, the cell is referred to as an antigen-presenting cell (APC). Finally, T cells with the cluster of differentiation 8 receptor protein (CD8+) bind to the epitope-MHC-I complex. These CD8+ T cells (also called cytotoxic T cells, or CTCs) then induce the APC to initiate apoptosis which, in general terms, means that the CTCs tell the APC to kill itself.

In the exogenous processing pathway, the malformed protein is first endocytosed from the extracellular environment into the endosome of what will become an APC. In other words, the malformed protein is "absorbed" into a cell. The protein is then degraded into epitopes by proteases in a manner similar to that for the endogenous processing pathway. The epitopes then bind to major histocompatibility complex II proteins (MHC-II), and the epitope-MHC-II complex is presented on the cell surface. The epitopes which bind to the MHC-II complex tend to be about 15 amino acids in length and are therefore somewhat longer than those which bind to MHC-I. Thus, the exogenous processing pathway also creates APCs. T cells with the cluster of differentiation 4 receptor protein (CD4+) bind to the epitope-MHC-II complex. Unlike CTCs, CD4+ T cells release cytokines, or signaling substances, which activate B cells or CTCs. Because the CD4+ T cells activate other cells rather than directly acting, they are often called helper T cells.

The MHC system in a human is also referred to as the human leukocyte antigen (HLA) system. Each person has three types of HLA-I genes, referred to as HLA-A, HLA-B and HLA-C. Additionally, each person has two versions of each of those genes (one inherited from the mother and one from the father). The specific versions of those genes are referred to as alleles. Thus, each person has up to six different HLA-I genes. While these genes are structurally similar, they differ in the strength with which they bind epitopes. Further, these genes are highly polymorphic, which means that different people have different alleles.

The situation is even more complicated for the HLA-II system. While there are also three types of HLA-II genes, referred to as HLA-DR, HLA-DP and HLA-DQ, they are each heterodimer complexes formed by two polymorphic genes (referred to as the respective alpha and beta chains). Again, each person inherits two alleles (one from the mother and one from the father) of each of the genes. Thus, in total, each person has (up to) twelve different HLA-II complexes. As with HLA-I, different people have different alleles, and thousands of different combinations have been observed.

SUMMARY

In an embodiment, the present invention provides a method of ranking epitopes derived from neoantigens as targets for personalized immunotherapy. Candidate epitopes are collected based on patient data of a cancer patient. A set of scores are calculated for each of the candidate epitopes, each of the scores in a respective one of the sets for a respective one of the candidate epitopes representing an independent measure of a likelihood of the respective one of candidate epitopes to elicit an immune response in the cancer patient. The scores in each of the sets of scores are combined into a single score for each of the candidate epitopes. The single scores for the candidate epitopes in each case reflect an overall likelihood of eliciting the immune response in the patient. The candidate epitopes are ranked using the single scores for the immunotherapy.

BRIEF DESCRIPTION OF THE DRAWING

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 3 is a schematic overview of the design of neoepitopes depending on a type of somatic mutation in accordance with an embodiment of the present invention.

DETAILED DESCRIPTION

Figure 1:
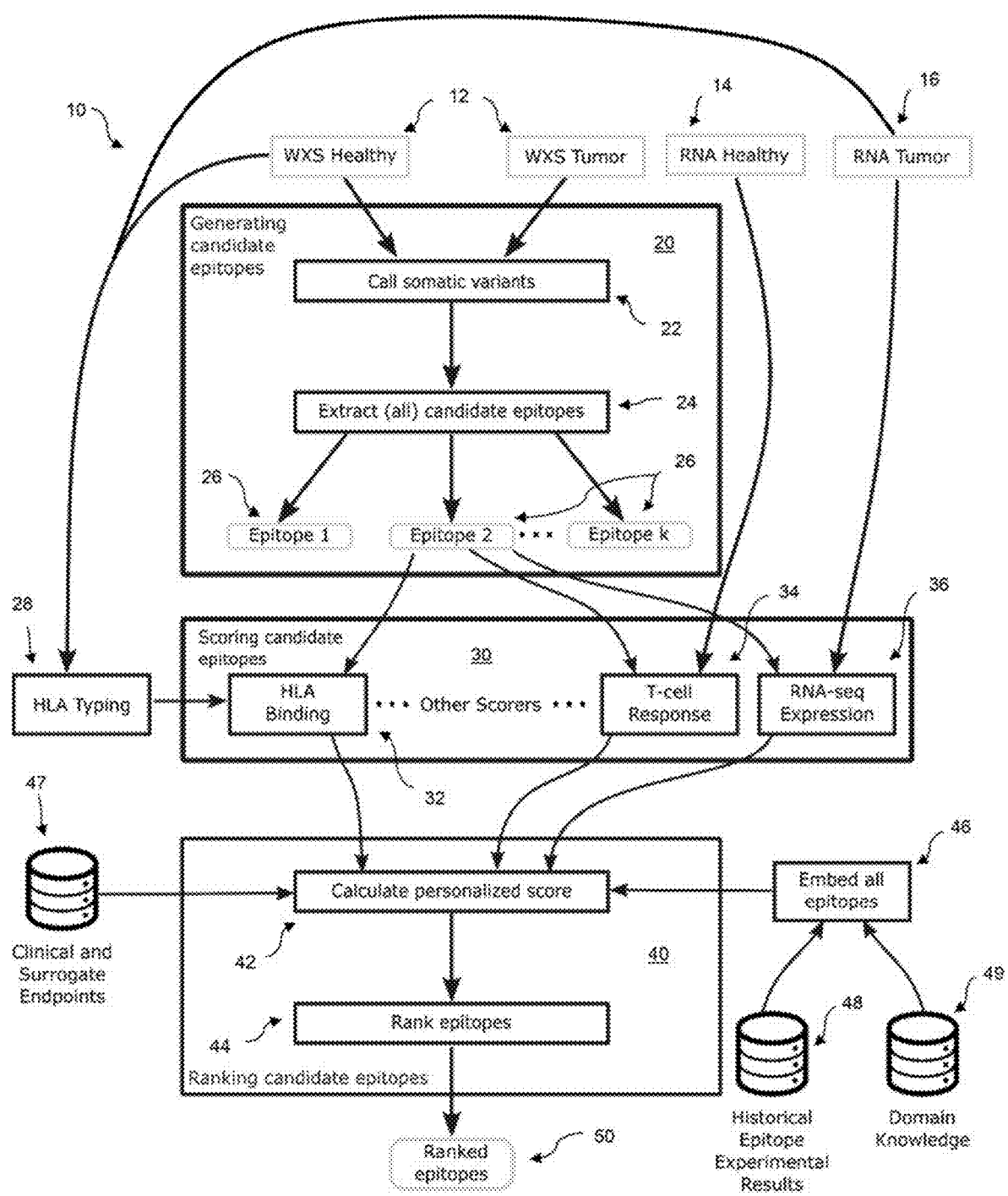
FIG. 1 is a schematic overview of a computer system and method for ranking and selecting target epitopes for immunotherapy.

Embodiments of the present invention provide a method and a system for ranking or prioritizing neoantigens, or epitopes derived from a neoantigen, also referred to as neoepitopes, according to their likelihood to elicit an immune response in a particular patient as a target for immunotherapy. The method and system estimates a single, personalized score for each epitope from various indicators based on personal data. This score is then combined with domain knowledge to create the prioritization of neoantigens. In addition to being able to estimate with better accuracy which epitopes will offer the best targets for particular patients, embodiments of the present invention advantageously consider the diversity of the neoantigens to better identify the most promising targets.

Not all neoepitopes are equally promising targets for therapy. As described above, the pathways through which neoantigens eventually elicit an immune response are very complex, and they could fail at any step. For example, some neoantigens result in epitopes which cannot bind to the appropriate HLA complexes which are present within the particular person, while others may result in DNA which is never even translated into protein, so the pathways are not active in the first place. Thus, being able to rank or prioritize the neoepitopes based on their likelihood to elicit an immune response can significantly increase the likelihood that a neoantigen-based immunotherapy will be effective for a particular patient. In contrast to known approaches, embodiments of the present invention are able to produce more accurate predictions by explicitly incorporating known experimental results from similar epitopes to determine the ranking.

In an embodiment, the present invention provides a method of ranking epitopes derived from neoantigens as targets for personalized immunotherapy. Candidate epitopes are collected based on patient data of a cancer patient. A set of scores are calculated for each of the candidate epitopes, each of the scores in a respective one of the sets for a respective one of the candidate epitopes representing an independent measure of a likelihood of the respective one of candidate epitopes to elicit an immune response in the cancer patient. The scores in each of the sets of scores are combined into a single score for each of the candidate epitopes. The single scores for the candidate epitopes in each case reflect an overall likelihood of eliciting the immune response in the patient. The candidate epitopes are ranked using the single scores for the immunotherapy.

In the same or other embodiment, each of the sets of scores includes at least a first score indicating a likelihood of human leukocyte antigen (HLA) binding which is determined using HLA alleles which are specific to the cancer patient, and a second score indicating a T-cell response which is predicted using a T-cell receptor (TCR) repertoire which is identified using healthy ribonucleic acid (RNA)-sequence data specific to the cancer patient.

In the same or other embodiment, each of the sets of scores further comprises a third score based on tumor RNA-sequence data specific to the cancer patient.

In the same or other embodiment, the method further comprises: extracting experimentally-verified properties of the epitopes and domain knowledge about the epitopes, and embedding each of the epitopes in a vector space based on the experimentally-verified properties and the domain knowledge.

In the same or other embodiment, the candidate epitopes are ranked based on the single scores and the embeddings.

In the same or other embodiment, the ranking is performed in an order of largest weighted distances in the vector space, the weighted distances in each case being determined based on Euclidean distances in the vector space multiplied by the single score for each respective one of the candidate epitopes such that one of the candidate epitopes with a largest weighted distance from an origin of the vector space is ranked first followed by one of the candidate epitopes having a largest weighted difference from the top-ranked epitope.

In the same or other embodiment, the embedding is performed using a representation learning embedding framework which uses an affinity graph in which nodes represent the epitopes and edges connect the epitopes which have a similarity measure above a predefined threshold, wherein attributes of the nodes include at least the experimentally-derived properties and the domain knowledge, and wherein an embedding function is learned for each of the attributes to map the attributes to numeric vectors. Alternatively, the embedding is performed by direct embedding in which at least the experimentally-derived properties and the domain knowledge are each embedded using numeric vectors which are concatenated together.

In the same or other embodiment, the embeddings include vector representations of biochemical properties of the epitopes.

In the same or other embodiment, the embeddings include vector representations of amino acid sequences of the epitopes.

In another embodiment, the present invention provides a computer system for ranking epitopes derived from neoantigens as targets for personalized immunotherapy, the computer system comprising memory and one or more processors which, alone or in combination, are configured to provide for execution of the method according to any of the embodiments described above.

In the same or other embodiment, each of the sets of scores includes at least a first score indicating a likelihood of human leukocyte antigen (HLA) binding which is determined using HLA alleles which are specific to the cancer patient, and a second score indicating a T-cell response which is predicted using a T-cell receptor (TCR) repertoire which is identified using healthy ribonucleic acid (RNA)-sequence data specific to the cancer patient.

In the same or other embodiment, the computer system being further configured to provide for execution of the following steps: extracting experimentally-verified properties of the epitopes and domain knowledge about the epitopes, and embedding each of the epitopes in a vector space based on the experimentally-verified properties and the domain knowledge, wherein the candidate epitopes are ranked based on the single scores and the embeddings.

In the same or other embodiment, the ranking is performed in an order of largest weighted distances in the vector space, the weighted distances in each case being determined based on Euclidean distances in the vector space multiplied by the single score for each respective one of the candidate epitopes such that one of the candidate epitopes with a largest weighted distance from an origin of the vector space is ranked first followed by one of the candidate epitopes having a largest weighted difference from the top-ranked epitope.

In a further embodiment, the present invention provides a non-transitory computer-readable medium having instructions thereon, which, upon execution by one or more processors, alone or in combination, and using memory, provides for execution of the method according to any of the embodiments described above.

In a further embodiment, the present invention provides a production method of neopeptides comprising (a) a process of execution of the method of ranking epitopes according to any of the embodiments described herein and (b) a process of synthesizing a neopeptide identified by the execution of the method of ranking epitopes.

In a further embodiment, the present invention provides a neopeptide obtained by a process of execution of the method of ranking epitopes according to any of the embodiments described herein and a process of synthesizing a neopeptide identified by the execution of the method of ranking epitopes.

In a further embodiment, the present invention provides a pharmaceutical composition comprising a neopeptide identified by the execution of the method of ranking epitopes according to any of the embodiments described herein.

In a further embodiment, the present invention provides a pharmaceutical composition for use in the treatment of cancer, wherein the pharmaceutical composition comprises a neopeptide identified by the execution of the method of ranking epitopes according to any of the embodiments described herein.

In a further embodiment, the present invention provides a method of treating cancer in a subject, comprising administering to the subject a neopeptide identified by the execution of the method of ranking epitopes according to any of the embodiments described herein.

In a further embodiment, the present invention provides the use of a neopeptide identified by the execution of the method of ranking epitopes according to any of the embodiments described herein, for the preparation of a medicament for the treatment of cancer.

FIG. 1 is a schematic overview of a method and system 10 for determining and prioritizing epitopes or neoepitopes according to an exemplary embodiment, as well as several openly-available components to demonstrate the context in which embodiments of the present invention are useable. The system 10 implements the method comprising three main phases:
1. Generating candidate epitopes 26, in which the candidate epitopes 26 are identified based on whole exome sequencing (WXS) data 12 of a single patient;
2. Scoring the candidate epitopes 26, in which evidence components assign scores to each candidate epitope 26 independently. It is important in particularly advantageous embodiments of the present invention that all or at least part of these scores are based on personalized data.
3. Ranking the candidate epitopes 26, in which the personalized scores are combined with historical data and domain knowledge, encoded in embeddings, and a final ranking of epitopes 50 is constructed.

The various system components shown in FIG. 1 for executing phases 1-3, as well as the components for embedding epitopes and HLA typing, can be a single server, or computer processor with access to memory, or multiple different servers and/or processors with access to memory, which each perform parts of phases 1-3, embedding and/or HLA typing.

Phase 1 is executed by a candidate epitope generator component 20 for generating candidate epitopes 26 and includes a somatic variant identifier component 22 which is programmed to call somatic variants. This somatic variant identifier component 22 identifies somatic variants as neoantigens from the WXS data 12. The somatic variant identifier 22 compares the tumor and healthy WXS data 12 of a patient to determine variants which appear in the tumor sample, but not in the healthy one, and identify these variants as the somatic variants, or neoantigens. As one particular example, the genome analysis toolkit (GATK), developed by the Broad Institute offers a best practices workflow for somatic short variant discover (SNVs+Indels), which is commercially available online and hereby incorporated by reference in its entirety herein, that could be used to implement this step.

Then, the candidate epitopes 26 are extracted by a candidate extracting component 24 in two steps. First, the type of each identified somatic variant is annotated based on the change of amino acid sequence for the protein-coding region. For example, a somatic variant could result in a different amino acid at a particular position (a missense mutation) or a short insertion or deletion of amino acids in the tumor sequence data compared to a healthy sample. Second, all possible 9-mers ("class-I epitopes") and 15-mers ("class-II epitopes") including the identified somatic variants are generated as the set of candidate epitopes 26. As an example, the annotation could be performed using the Variant Effect Predictor (VEP) tool from the group Ensembl which is available online and hereby incorporated by reference herein, along with McLaren, W., et al., "The Ensembl Variant Effect Predictor," Genome Biology, June 6; 17(1): 122 (2016). The 9-mers and 15-mers are generated by a sliding window strategy. For example, in the case of a missense mutation at position 10, a 9-mer based on position 2 through 10 is generated; then, another 9-mer based on positions 3 through 11 is generated, and so on, until a 9-mer based on positions 10 through 18. That is, all possible windows of size 9 (and 15) including the mutation are used to generate candidate epitopes. Similar approaches are used to create candidate epitopes from deletions and short insertions. In the case of long insertions (more than 9 amino acids), then a sliding window approach is also applied, although it may include amino acids only from the somatic variant.

In an HLA typing component 28, the patient's HLA-I alleles are determined using the WXS data 12, while the patient's HLA-II alleles are determined using the tumor RNA-sequencing (RNA-seq) data 16. Both of these determinations can be made according to standard practices. For example, the HLA-I alleles can be determined using the tool OptiType discussed by Szolek, A., et al. "OptiType: precision HLA typing from next-generation sequencing data. Bioinformatics," 30, pp. 3310-3316 (2014), and the HLA-II alleles can be identified using the tool seq2HLA discussed by Boegel, S., et al., "HLA typing from RNA-Seq sequence reads," Genome Medicine, 4 (2012), each of which are hereby incorporated by reference herein.

Phase 2 is executed by a candidate epitope scoring component 30 for scoring the identified candidate epitopes from phase 1, individual scores for the rankings are calculated from the evidence components. According to an exemplary embodiment, three evidence components in particular are used, specifically, an HLA binding component 32, a T-cell response component 34 and a RNA-seq expression component 36, although others could be used in other embodiments. The three components are generally the same for both class-I and class-II epitopes, although specific differences are discussed as relevant below. The predictive T-cell response component 34 is a new component introduced in embodiments of the present invention, and provides the advantages discussed herein. The HLA binding component 32 calculates a binding score of each of the candidate epitopes to each HLA allele identified in the patient. The HLA binding component 32 only considers the HLA-I alleles when predicting the binding score of the class-I epitopes (9-mers), and likewise only considers the HLA-II alleles when predicting the binding score of the class-II epitopes (15-mers).

Existing published and publicly-available neoantigen discovery and ranking pipelines include predictions of HLA binding. Thus, the HLA binding component 32 simply behaves as a function (for example, a machine learning model) which takes as input the epitope sequence and allele, and outputs the predicted binding score. The score could be either a probability of binding or a number proportional to the biochemical binding affinity between the epitope and allele. A published model for HLA binding, such as Kuksa, P. et al., "High-order neural networks and kernel methods for peptide-MHC binding prediction," Bioinformatics, 31, 3600-3607 (2015), which is hereby incorporated in its entirety herein, can be used for this component. Since this component takes into account the patient-specific HLA alleles, the output can be considered as a personalized score.

The T-cell response component 34 calculates a score which represents the strength or likelihood of an immune response in the patient for the candidate epitopes 26. In particular, in a first step, the patient-specific T-cell receptor (TCR) repertoire is identified using healthy RNA-seq data 14, which may be specifically enriched for T cells, as discussed in references mentioned below. Then, this patient-specific information is used to predict the T-cell response for each candidate epitope 26. In particular, the T-cell response is calculated as two independent scores. The first score calculates the likelihood of TCR and epitope-HLA binding, for example in accordance with the pseudocode below. The second score calculates the likelihood that the epitope will elicit a T-cell response independent of binding (described below in the pseudocode).

Calculate T-Cell Receptor, Epitope-Hla Binding Affinity
   For each allele in the patient's set of HLA alleles
      For each candidate epitope, e
         For each T-cell receptor (TCR) in the patient's TCR repertoire
            Calculate the TCR, epitope, allele binding affinity, for example as described in Pierce, B. G., et al., "A flexible docking approach for prediction of T cell receptor-peptide-MHC complexes," Protein Science, 22, 35-46 (2013), which is incorporated by reference below
         Select the maximum binding affinity for e
   Linearly scale the maximum binding affinities for all candidate epitopes for the patient such that they are in the range [0,1]

In order to calculate the likelihood that an epitope will elicit a T-cell response (independent of the binding), a supervised machine learning model is trained using historical data from immune response experiments, such as in vivo experiments in human for epitopes with sources that are not neoantigens (e.g., viruses, see Dhanda, S. K., et al., "Predicting HLA CD4 Immunogenicity in Human Populations," Frontiers in Immunology, 9, 1369 (2018) or in vivo experiments based on epitopes used in transgenic mice, which are mice which have been genetically modified to have human MHC genes rather than those normally found in mice (see Calis, J. J., et al., "Properties of MHC Class I Presented Peptides that Enhance Immunogenicity, PLOS Computational Biology, 9 (2013) for examples). A first model is trained to predict the MHC-I response in CD8+ T cells and a second model is used to predict the MHC-II response in CD4+ T cells. Once trained, these models are used to predict the likelihood that each candidate epitope will elicit a response from the T-cell of the respective type.

Gong, Q., et al., "Assessment of T-cell receptor repertoire and clonal expansion in peripheral T-cell lymphoma using RNA-seq data," Scientific Reports, 7 (2017), which is hereby incorporated by reference in its entirety herein, show that the RNA-seq is an effective tool for assessing the TCR repertoire. Kato, T. et al., "Effective screening of T cells recognizing neoantigens and construction of T-cell receptor-engineered T cells," Oncotarget, 9, 11009-11019 (2018), which is hereby incorporated by reference in its entirety herein, show that the TCR repertoire is an important consideration when engineering T cells to target specific neoantigens for cell therapy. Further, traditional approaches discussed in Pierce, B. G., et al., "A flexible docking approach for prediction of T cell receptor-peptide-MHC complexes," Protein Science, 22, 35-46 (2013), which is hereby incorporated by reference in its entirety herein, have shown the T-cell receptor and epitope-HLA complex binding can be predicted. However, the patient-specific TCR repertoire and patient-specific HLA alleles have not been jointly considered for the purpose of prioritizing neoantigens according to their likelihood to provoke an immune response. Since the T-cell response component takes into account the patient-specific TCR repertoire, it is personalized.

The RNA-seq expression component 36 calculates a score based on the RNA-seq expression of the transcript (that is, the version of a gene which becomes RNA; see Alberts B., et al., incorporated by reference above) which contains the neoantigen in the tumor sample. This can be performed using standard analysis pipelines. It is derived directly from the patient's RNA, so it is clearly personalized. For example, Conesa, Ana, et al. "A survey of best practices for RNA-seq data analysis." Genome Biology, vol. 17, 13.26, doi: 10.1186/s13059-016-0881 (Jan. 2016) provided a survey of best practices for RNA-seq data analysis which describes several multi-step pipelines to estimate the expression of each transcript. The expression is given as a single number, the "transcripts per million," or TPM, which has a minimum value of 0 and a theoretical maximum value of 1 million. In practice, values like 100 are typically considered "high." According to an embodiment of the present invention, the RNA-seq expression score is calculated by capping the TPM for all transcripts to 100 and then dividing by 100. Thus, all transcripts have an RNA-seq expression score of 0 to 1 in this embodiment. The score of the source transcript is assigned to each candidate epitope. In cases where a candidate epitope could have originated from multiple, overlapping transcripts, preferably one copy of the epitope for each possible source transcript is created.

Only three possible scorers are described herein for the exemplary embodiment. However, a wide variety of other epitope scorers have been proposed in the academic literature. For example, read depth and allele frequency of the neoantigen within the tumor RNA-seq data 16 is another commonly-used approach to rank candidate epitopes. In the case of read depth, the score for a candidate epitope is given as the number of RNA-seq reads which contain the somatic variant which led to the creation of the candidate epitope. This number is capped to 100 and scaled between 0 and 1 just like the RNA-seq expression. For the allele frequency, two scores are calculated as the frequency of the somatic variant (compared to the normal, reference sequence) in the whole exome sequencing or RNA-seq of the tumor sample. According to other embodiments of the present invention different scorers can be implemented alternatively or additionally to the three exemplary epitope scorers.

In phase 3 of ranking the candidate epitopes 26, by a candidate epitope ranker component 40, for each of the candidate epitopes 26, a single, personalized score is calculated, using a personalized score calculator component 42, for the likelihood of the respective candidate epitope 26 to elicit an immune response by combining the scores calculated by the evidence components. A supervised machine learning approach is used, preferably offline, to learn how to combine the scores.

When epitope-specific clinical or surrogate endpoints are available, such as cancer antigen (CA) 125 levels in the blood for ovarian cancer or the time span for progression-free survival, these are first converted to an appropriate representation to express whether the epitope elicited an immune response. For example, it could be decided that epitopes associated with reduced CA 125 levels in patients have elicited a positive immune response, therefore considering the immune response as a binary variable. Alternatively, the amount of reduction of CA 125 can be associated with each epitope and therefore, in this case, the immune response is a continuous variable. Such epitope-specific clinical or surrogate endpoints can be stored in and retrieved from a clinical and surrogate endpoints database 47.

In the case that no endpoints are available, then proxy endpoints are designed. These endpoints may be based on other experimental data which are not clinical or surrogate endpoints. Alternatively, they may be determined by computer simulation, or chosen manually.

In either case, any appropriate, state-of-the-art supervised machine learning model could be trained to predict the chosen endpoint (i.e., immune response) based on the scores from the evidence components. In particular, scores are calculated for all epitopes with clinical and surrogate (or proxy) endpoints database 47. Then, the supervised machine learning model is trained to predict the known endpoint in the database. In the case that a linear model is chosen, then the result of learning will be the appropriate weights for each score to best predict the endpoints. If other model classes, such as random forests or neural networks, are chosen, then the exact interpretation of the learned model may be less clear. Nevertheless, the result in either case is a machine learning model which takes as input the scores for an epitope and predicts the chosen endpoint (i.e., immune response). The same model is then used to predict the immune response of epitopes for which endpoints are unknown.

In the embed all epitopes component 46, a "location", or embedding, is calculated for each of the candidate epitopes 26 within a vector space. This embedding may incorporate sequence similarity, biochemical properties, known experimental results, domain knowledge, and other properties of each epitope 26. The embed all epitopes component 46 has access to physical memory databases including such information, such as a historical epitope experimental results database 48 and a domain knowledge database 49. Two examples referred to herein as "direct embedding" and "representation learning embedding" are given for how these properties may be incorporated into the embedding. These are only illustrative examples.

For sequence similarity in direct embedding, each epitope is represented as a one-hot encoded vector based on its sequence. For example, considering only a small subset of amino acids: R, K, D, E, a one-hot encoding will use (1,0,0,0) for R, (0,1,0,0) for K, and so forth. An epitope is then represented as the concatenation of each of its amino acids, as shown in this example:

REDD: R (1,0,0,0); E (0,0,0,1); D (0,0,1,0); D (0,0,1,0): (1,0,0,0, 0,0,0,1, 0,0,1,0, 0,0,1,0)

For biochemical properties in direct embedding, embedding a 4-mer in a 12-dimensional space based on the charge, polarity, and hydrophobicity of each amino acid in the epitope can be utilized. In this example, it is assumed that the amino acids have the following properties, which are also available online:

Charged: R, K, D, E
Polar: Q, N, H, S, T, Y, C, W
Hydrophobic: A, I, L, M, F, V, P, G Thus, it is possible to choose to embed each charged amino acid as (1,0,0), each polar amino acid as (0,1,0) and each hydrophobic amino acid as (0,0,1). These embeddings are not unique, and other embedding schemes, such as 1 for charged, 2 for polar, and 3 for hydrophobic, could be used.

With the chosen embedding scheme, the following examples are provided:

MSDE: M (0,0,1); S (0,1,0); D (1,0,0); E (1,0,0): (0,0,1, 0,1,0,1,0,0,1,0,0)
RKAD: R (1,0,0); K (1,0,0); A (0,0,1); D (1,0,0): (1,0,0, 1,0,0,0,0,1,1,0,0)
WILD: (0,1,0,0,0,1,0,0,1,1,0,0)

These embeddings are independent of the particular patient, and they can be thought of as representing "background knowledge" about the epitopes.

In some cases, known experimental results are available for a particular epitope, and they can be used in a direct embedding. For example, the binding affinity of a particular epitope for specific HLA-I or HLA-II alleles may be known. This information is directly embedded using numeric vectors containing the appropriate values. When the respective experimental result is not known for a particular epitope, the value is considered "missing." Later, standard machine learning techniques for handling missing values may be used to account for these missing values.

For domain knowledge in direct embedding, in many cases, additional information may be known about a particular epitope. For example, it may be produced as a result of a mutation documented in the single nucleotide polymorphism database (dbSNP, available online), which includes the clinical significance (like "benign" or "likely-pathogenic") of the mutation on many disease (which have identifiers such as "RCV000302825.1"), or the epitope may result due to changes in known tumor-associated genes. Suitable data representations, such as bag of words for text data or indicators for binary data (such as whether the epitope is due to changes in known tumor-associated genes), and preprocessing are used to capture this information.

The final direct embedding is found for each epitope by combining the above vectors into a single vector. For example, each of the individual vectors are concatenated to form one large vector, for example as discussed below. In doing so, binary/categorical values can be treated as normal number values which are 0 or 1, according to an embodiment. According to another embodiment, discussed further below, a more sophisticated approach can be used.

Simplified examples of domain knowledge of known epitopes, and the resulting direct embeddings when different from the domain knowledge value, are as follows. The standard machine learning approaches used to create the direct embeddings, or "no change," are given in parentheses.

EPITOPE 1
    epitope_sequence (not used for embedding): AGTW (SEQ ID NO: 1)
    sequence_biochemical_properties (no change): [0,0,1,0, 0,1,0,1,0,0,1,0]
    HLA_A*0201_binding (no change): 5.3
    HLA_B*2705_binding (no change): ?
    HLA_DRB1*1201_binding (no change): 3.2
    dbSNP_RCV000302825.1_clinical_significance (one-hot encoding): ? ([0,0,0,0])
    dbSNP_RCV000587704.1_clinical_significance (one-hot encoding): Benign ([1,0,0,0])
    Oncogene (one-hot encoding): No ([1,0])
    Gene_description (standard natural language preprocessing, followed by term frequency-inverse document frequency): Component of the ribosome, a large ribonucleoprotein complex responsible for the synthesis of proteins in the cell. ([0.2, 0, 0, 0.1, 0.1, 0.5, 0.3, 0.6])
    Direct embedding: concatenate ([0,0,1,0,0,1,0,1,0,0,1,0], [5.3,?, 3.2], [0,0,0,0], [1,0,0,0], [1,0], [0.2, 0, 0, 0.1, 0.1, 0.5, 0.3, 0.6])

EPITOPE 2
    epitope_sequence (not used for embedding): PLKK (SEQ ID NO: 2)
    sequence_biochemical_properties (no change): [0,0,1,0, 0,1,1,0,0,1,0,0]
    HLA_A*0201_binding (no change): ?
    HLA_B*2705_binding (no change): 6.5
    HLA_DRB1*1201_binding (no change): ?
    dbSNP_RCV000302825.1_clinical_significance (one-hot encoding): Likely-benign ([0,1,0,0])
    dbSNP_RCV000587704.1_clinical_significance (one-hot encoding): Benign ([1,0,0,0])
    Oncogene (one-hot encoding): Yes ([0,1])
    Gene_description (standard natural language preprocessing, followed by term frequency-inverse document frequency): Mediates pre-mRNA alternative splicing regulation. Binds to splice sites in pre-mRNA and regulates splice site selection. ([0, 0, 0.3, 0.8, 0, 0.1, 0.2, 0])
    Direct embedding: concatenate ([0,0,1,0,0,1,1,0,0,1,0,0], [?, 6.5,?], [0,1,0,0], [1,0,0,0], [0,1], [0, 0, 0.3, 0.8, 0, 0.1, 0.2, 0])

EPITOPE 3
    epitope_sequence (not used for embedding): RMI
    sequence_biochemical_properties (no change): [1,0,0,0, 0,1,0,0,1]
    HLA_A*0201_binding (no change): 2.3
    HLA_B*2705_binding (no change): 5.9
    HLA_DRB1*1201_binding (no change): 6.1
    dbSNP_RCV000302825.1_clinical_significance (one-hot encoding): Likely-pathogenic ([0,0,1,0])
    dbSNP_RCV000587704.1_clinical_significance (one-hot encoding): Pathogenic ([0,0,0,1])
    Oncogene (one-hot encoding): Yes ([0,1])
    Gene_description (standard natural language preprocessing, followed by term frequency-inverse document frequency): Transcriptional regulator which is crucial for the development and inhibitory function of regulatory T-cells (Treg). Plays an essential role in maintaining homeostasis of the immune system by allowing the acquisition of full suppressive function and stability of the Treg lineage ([0.9, 0.7, 0.8, 0, 0, 0, 0, 0.9])
    Direct embedding: concatenate ([1,0,0,0,0,1,0,0,1], [2.3, 5.9, 6.1], [0,0,1,0], [0,0,0,1], [0,1], [0.9, 0.7, 0.8, 0, 0, 0, 0, 0.9])

EPITOPE 4
    epitope_sequence (not used for embedding): TAG
    sequence_biochemical_properties (no change): [0,1,0,0, 0,1,0,0,1]
    HLA_A*0201_binding (no change): 6.1
    HLA_B*2705_binding (no change): ?
    HLA_DRB1*1201_binding (no change): 2.1
    dbSNP_RCV000302825.1_clinical_significance (one-hot encoding): ? ([0,0,0,0])
    dbSNP_RCV000587704.1_clinical_significance (one-hot encoding): ? ([0,0,0,0])
    Oncogene (one-hot encoding): ? ([0,0])
    Gene_description (standard natural language preprocessing, followed by term frequency-inverse document frequency): ? ([0,0,0,0,0,0,0,0])
    Direct embedding: concatenate ([0,1,0,0,0,1,0,0,1], [6.1,?, 2.1], [0,0,0,0], [0,0,0,0], [0,0,], [0,0,0,0,0,0,0,0])

In these examples, the order of the indicators in the one-hot encodings for clinical significance is: [benign, likely-benign, likely-pathogenic, pathogenic]. For the binary variable Oncogene ("does this somatic variant occur in a known oncogene?"), the order of the indicators is: [no, yes]. For the Gene_descriptions, eight terms remain after the standard preprocessing, so the vectors are all of length eight. For these variables, vectors of all zeros are used to indicate missing values. Other strategies, such as an additional indicator field (for example, [no, yes, missing] for Oncogene) could also be used. Missing numeric values, such as the known binding affinities, are left as "missing" using standard representations, such as "not a number."

As an alternative to the above direct embedding approach, a more sophisticated representation learning embedding approach can be used. In a preferred embodiment, the embedding propagation (EP) framework discussed in Garcia-Duran, A., et al. "Learning Graph Representations with Embedding Propagation," Advances in Neural Information Processing Systems, 30 (2017), which is hereby incorporated by reference herein in its entirety, is used. EP takes as input an affinity graph, in which nodes represent entities and edges connect similar entities. A set of attributes is provided for each node. Some attributes may be missing for some nodes. EP learns an embedding function which maps the attributes to numeric vectors. Different functions are learned for each attribute, and different types of functions can be learned for different attribute types. The parameters of the functions are learned such that the numeric vectors for neighboring nodes in the graph are similar.

In this setting, each node in the graph for EP corresponds to an epitope, and edges connect similar epitopes. As an example of similarity, all epitopes which have a similarity above a particular threshold can be connected according to a sequence similarity measure, such as the Levenshtein distance. The attributes on each of the nodes could be, for example, the biochemical properties, experimental results and domain knowledge described above. Such representation learning approaches have not previously been used in this context.

Since the embeddings are used only to calculate distances, according to an embodiment, it would also be possible to define a kernel on epitopes rather than embeddings. However, embedding-based approaches are preferred as they have been shown to outperform kernel-based approaches in many contexts, for example, by Niepert, M., et al., "Learning Convolutional Neural Networks for Graphs," Proceedings of the 33rd International Conference on Machine Learning, (2016), which is hereby incorporated by reference herein in its entirety.

In the rank epitopes component 44, the candidate epitopes 26 are ranked based on their personalized scores and embeddings. The rank epitopes component 44 orders the candidate epitopes 26 into a final ranking 50 such that the high-ranking epitopes are both likely to induce an immune response and are in diverse parts of the embedding space. Further, the ranking 50 remains diverse in case some of the top-ranked epitopes must be discarded due to technical reasons.

According to an embodiment, the largest weighted distance between a single epitope and a set of epitopes selected "so far" is used. This is taken as the largest Euclidean distance between the single epitope and any epitope in the set "so far" multiplied by the score of the single epitope. This means that epitopes with low scores will always have low "largest weighted distances," regardless of their embedding location. On the other hand, epitopes with high scores, but similar embedding locations, will have relatively low distance. Thus, the procedure also encourages diversity by selecting epitopes with large scores which are distant from each other in the embedding space.

The candidate epitopes 26 can be being ranked using the following algorithm:
1. Select the epitope with the largest weighted distance from the origin (0,0, . . . ) location as the top-ranked epitope.
2. Select the epitope with the largest weighted distance from the top-ranked epitope as the second-ranked epitope.
3. Select the epitope with the largest weighted distance from both the top- and second-ranked epitopes, as the third-ranked epitope.
This process continues until all epitopes are ranked.

Embodiments of the present invention provide for the following improvements:
1) Calculating a single score reflecting the likelihood of eliciting an immune response for each epitope. The single score is the combination of a set of individual, independent scores which reflect personalized data, including the patient-specific T-cell receptor repertoire and HLA alleles.
2) Embedding epitopes in a vector space using representation learning based on their experimentally-verified properties and domain knowledge.
3) Ranking epitopes by combining the score, embedding location, and sequence diversity. In particular, this means that a ranking is created, as opposed to selecting a subset of epitopes. Further, the ranking is based both on the immune response likelihood and the diversity, not on the likelihood of response only.

According to an embodiment of the present invention, a method for prioritizing epitopes derived from neoantigens based on their likelihood to elicit an immune response, comprises the steps of:
1) Extracting experimentally-verified epitope properties;
2) Extracting domain knowledge about epitopes;
3) Embedding all epitopes in a vector space based on the experimentally-verified properties;
4) Collecting a set of candidate epitopes;
5) Calculating a set of scores for each epitope which each give an independent measure of the epitope's likelihood to elicit an immune response;
6) Combining the set of scores for each epitope into a single score reflecting the overall likelihood that the epitope elicits an immune response; and
7) Ranking the epitopes based both on their immune response likelihoods, embeddings, and sequence diversity.

Steps 1)-3) can be performed offline and steps 4)-7) can be performed online.

The modular scoring approach according to embodiments of the present invention advantageously allows to naturally incorporate epitope immunogenicity. To date, all described neoantigen selection pipelines have only considered HLA binding as the "end point" for selecting neoantigens. For example, Bjerregaard, A., et al., "MuPeXI: prediction of neo-epitopes from tumor sequencing data," Cancer Immunology, Immunotherapy, 66, 1123-1130 (2017) does not include a term for the T cell response. U.S. Pat. No. 10,055,540 explicitly states that the method predicts a likelihood of presentation on HLA alleles. Rubinsteyn, A., et al., "Vaxrank: Vaccine Peptide Selection," J. Computational Pipeline for the PGV-001 Neoantigen Vaccine Trial, Frontiers in Immunology, 8 (2018) describe to make the final ranking of candidate vaccine peptides according to predicted MHC binding and expression. Hundal, J., "pVAC-Seq: A genome-guided in silico approach to identifying tumor neoantigens," Genome Medicine, 2016, 8 aim "[t]o predict high affinity peptides that bind to the HLA class I molecule." However, they do not include immunogenicity in their predictions. U.S. Patent Application Publication No. 2016/0069895 describes a peptide screening platform. U.S. Patent Application Publication No. 2017/0224799 describes a method of using the conformational stability of an epitope in an MHC protein-binding groove to predict immunogenicity of peptides. Thus, they only consider the stability of the epitope and MHC binding. Accordingly, they likewise do not include immunogenicity in their predictions. Each of the foregoing publications are hereby incorporated by reference herein in their entirety.

Further, the system according to embodiments of the present invention allows inclusion of arbitrary functional annotations. For example, it is possible to prioritize neoantigens stemming from DNA changes in regions known to be associated with cancer. Thereby, the system can naturally prioritize "driver mutations." Again, existing published methods do not incorporate this type of domain knowledge.

The embedding model advantageously allows to directly incorporate experimental evidence about epitopes, when it is known. In contrast, existing methods only include such evidence indirectly via the trained machine learning models (see NetMHCPan for Bjerregaard et al. and Rubinsteyn et al.; NetMHC for Hundal et al.; and the custom neural network model in U.S. Pat. No. 10,055,540).

Also, the method according to embodiments of the present invention is advantageously equally applicable to the endogenous and exogenous pathways. Previous approaches only focus on the endogenous pathway. While U.S. Pat. No. 10,055,540 mentions using HLA-II bound epitopes in their training set, the predictions are only for HLA-I binding (i.e., the endogenous pathway).

For the proposed prioritization scheme, a set of candidate epitopes should be available. Alexandrov et al., "Signatures of mutational processes in human cancer," Nature, 2013, 500, 415-421 (2013) note that some forms of cancer, such as pilocytic astrocytoma and acute lyphoblastic leukemia, are associated with very few mutations, in which case, there may not be currently enough candidate epitopes to prioritize.

The determination of the weights of the individual scores in the combination is dependent on the selected outcome, and it is common for different clinical trials to consider different outcomes. For example, levels of CA 125 in the blood are a common quantitative end point for several types of cancer (notably for ovarian cancer). Other trials may consider progression-free survival times or other outcomes. Since these are different types of numbers on different scales, they may affect the importance of different scores, which are weighted.

Embodiments of the present invention can be used for selection of epitopes for use in vaccine-based immunotherapy and/or for providing "neoantigen discovery as a service."

Figure 2:
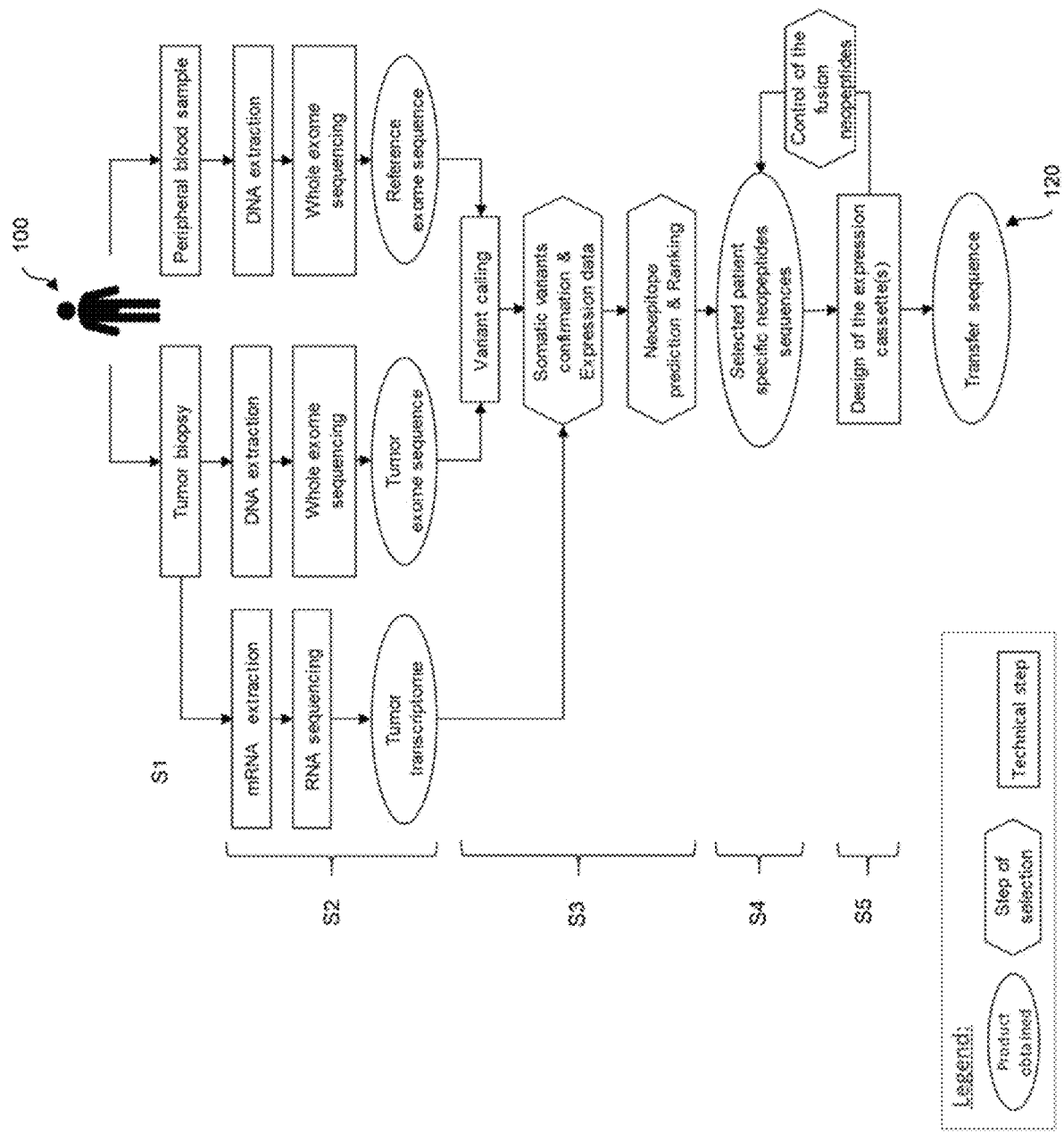
FIG. 2 is a flowchart of a method for preparation of plasmid carrying sequences encoding for patient-specific neopeptides.

FIG. 2 illustrates a method for predicting, ranking and selecting target neoepitopes to arrive at a transfer sequence 120 for a particular patient 100. Several steps S1-S5 are performed from the collection of patient samples (tumoral and normal tissues) in step S1 until the design of the transfer sequence 120 used to generate the plasmid carrying sequences encoding for patient specific neopeptides (or "patient specific plasmid") following step S5.

In step S1, patient tumor samples are obtained immediately following surgery. A portion of the sample is removed for formalin fixation and paraffin embedding (FFPE) and another piece of tissue is immediately frozen. A blood specimen is collected as whole blood in PAXgene tubes or as Ficoll-gradient separated peripheral blood mononuclear cells (PBMC). Samples are stored at −80° C. (or in nitrogen vapor) until sequence analysis.

In step S2, the whole exome sequencing (WES) is preferably performed in an accredited laboratory. Genomic DNA from tumor and peripheral sample is sheared, end repaired, ligated with barcoded ILLUMINA sequencing adapters, amplified, and size selected. Frozen tumor tissue is used preferably. When unavailable, the FFPE tumor sample is used for WES. In this embodiment, exome is targeted using the Nextera Rapid Capture Exome v1.2 bait set from ILLUMINA or equivalent. This capture method covers approximately 37.7 Mb of exonic regions including all coding regions of the NCBI's RefSeqGene database (see O'Leary, et al., "Reference sequence (RefSeq) database at NCBI: current status, taxonomic expansion, and functional annotation," Nucleic Acids Res, 44: D733-45 (2016)). Resulting libraries are then qPCR quantified, pooled, and sequenced as at least 2×75 bp paired-end reads using ILLUMINA sequencers to obtain the fastq files.

For RNA sequencing library construction, RNA is extracted from the frozen sample preferably, or from FFPE samples when frozen material is unavailable. RNA-Seq libraries are prepared using TruSeq RNA Access Library Prep Kit From ILLUMINA or equivalent. Total RNA concentration is quantified and normalized prior to library preparation. Using the TruSeq RNA Access Library Prep kit or equivalent, a stranded cDNA library is prepared which is then hybridized to a set of DNA oligonucleotide probes to enrich the library for mRNA transcript fragments. The transcriptome capture targets 21,415 genes, representing 98.3% of the RefSeq exome (same bait set as the Rapid Capture Exome). Each sequencing run is run with read lengths of at least 2×50 bp paired-end.

In step S3, somatic mutations are identified. For every patient, candidate epitopes are identified via variant calling from the tumor and normal whole exome sequencing reads. The tumor and normal whole exome sequencing reads are trimmed and filtered using Trimmomatic, a flexible read trimming tool for sequence data. After quality control, they are aligned against the human GRCh38 reference genome using BWA-MEM. Alignment files are processed according to GATK Best Practices. For candidate generation, all possible peptide sequences including the mutated amino acid are generated based on the 9-mer or 15-mer window size.

To determine the patient HLA genotype, whole exome sequencing reads are trimmed and aligned against the IMGT/HLA database using RazerS3. HLA class I alleles are identified using OptiType. The tumor RNA-seq reads are trimmed after filtering for low-quality reads using Flexbar, and ribosomal RNA reads are filtered out using bowtie2. After quality control, they are aligned against the IMGT/HLA database using bowtie. HLA class II alleles are identified using seq2HLA.

Further in step S3, immunogenicity scoring and ranking of candidate epitopes takes place. Relevance of candidate epitopes for the design of a vaccine are scored and ranked using a series of biological and biochemical factors driving their relevance as tumor specific immune targets. These factors include binding affinity to the patient HLA, similarity to epitopes known to be immunogenic, level of expression at transcriptional level, frequency of the mutation, homology to normal human sequences, homology to viral protein, and likelihood that a given sequence will be processed by the intracellular machinery for presentation. These factors are taken in account in the scoring by the calculation of several evidence components, as in the above embodiments, which define an index reflecting each of these factors. Evidence components, examples of which are described above and in the following, are used to derive an overall score and rank for each candidate epitope. Evidence components can be generally the same for both class-I and class-II epitopes, although specific differences are pointed out when relevant below. The evidence components are computer processing components specially configured to receive their respective inputs, preferably from memory or databases, and output a respective score.

For HLA binding affinity, a high performing machine learning algorithm based on high-order kernel support vector machines was trained using a proprietary database of binding affinity measured using a laboratory in vitro assay. Briefly, peptide binding to HLA class I molecules is measured by a stabilization assay using TAP-deficient tumor cell lines. That allows accurate measurement of binding affinities and thus enables better prediction. In this embodiment, a study was performed analyzing HLA-A*02:01-binding peptides and used widely available T2 cells, and several cell lines suitable for analysis of other HLA class I allelic molecules were also generated. C1R cells (ATCC, Manassas, VA) which express neither HLA-A nor B molecules were transfected with different HLA-A genes of interest. Then, the transporter associated with antigen processing (TAP) gene was deleted using Crispr/Cas9 system which give rise to the emergence of substantial number of "empty HLA molecules" on cell surface. A monoclonal antibody (mAb) was developed to detect peptide-loaded HLA-A molecules, which recognizes most of the HLA-A allelic molecules in a peptide promiscuous fashion. By using TAP-deficient cell lines and this mAb, highly accurate measurement of binding affinities is possible. For analysis of HLA class II molecules, a method was developed to measure peptide binding to the HLA class II molecules on cell surface of live antigen presenting cells (APCs). The method was characterized firstly by measuring binding of 11-mer peptides bearing 2-amino acid extensions at N- and C-termini to protect peptides from degradation by the cell-associated peptidases. That secures accuracy of peptide concentration during binding assay. In the public databases most HLA class II-binding data were obtained using longer peptides, which obscures exact sequence information for peptides making direct contact with HLA class II molecules. Secondly, peptide binding to HLA class II molecules on live cells was facilitated at pH6.0 and by the addition of p-chlorophenol, a hydrogen bond exchanger which enables efficient peptide loading, and thus an accurate measurement of binding affinities. This method utilizes natural machinery of antigen presentation and, unlike other methods using affinity purified HLA class II, does not use detergents that may affect peptide binding. The models predict a value which is proportional to the binding affinity; while the range of scores vary, typical "strong binders" have scores in the range [5,7].

To determine similarity to epitopes of known immunogenicity, an evidence component uses deep convolutional neural networks (CNN) to score a candidate epitope likelihood to elicit a T-cell response in in vitro immunogenicity assays. Rather than learning an arbitrary embedding of each amino acid, instead known biochemical properties (e.g., polarity and hydrophobicity) are used, as well as evolutionary features (BLOSUM62 mutation values). These models are trained using public CD4 or CD8 immune response data from the immune epitope database (IEDB). Since the model predicts a likelihood, this score is always in the range [0,1].

For RNA expression, FPKM (Fragments Per Kilobase Million) values are extracted from RNA-seq read files. RNA-seq values are transformed to the range [0, 1] by first capping all FPKM values to 100 (that is, FPKM values above 100 are set to 100). Epitopes originating in transcripts for which the estimated FPKM is less than 1 are filtered out. To generate the RNA expression score, the values are then linearly scaled from [0, 1].

For DNA, RNA allele frequency, evidence components give the frequency of the mutation or indel in the WES or RNA sequencing of the tumor sample, respectively. Thus, it is always in the range [0, 1].

For RNA allele depth, an evident component gives the number of RNA sequencing reads which include the mutation or indel responsible for the epitope. The counts are clipped to 100 and linearly scaled from [0, 1]. Epitopes which do not have any RNA sequencing support are filtered.

For human sequence homology, an evidence component compares the epitope sequence to its closest homolog in the human proteome. In particular, a basic local alignment search tool (BLAST) database is constructed using the human proteome (Ensemble, GRCh38, version 90).0 A BLAST search is then performed, and for each hit, the normalized blocks substitution matrix (BLOSUM) similarity is computed, which ranges from 0 (completely different sequence) to 1 (exactly the same sequence). The score from this component is taken as (1-similarity). For example, in the case that the epitope actually occurs elsewhere in the human proteome, this score is 0.

For homology to viral sequences, an evidence component compares the epitope sequence to its closest homolog in the viral proteome as viral protein are more likely to elicit an immune response. It is similar to the human homology component. A BLAST database is constructed using the non-redundant viral protein sequences from RefSeq version 91. A search is performed using the same parameters as in the human homology component and again the most similar match is found; in this case, though, the similarity is used as the score. Thus, epitopes which are similar to viral sequences have a higher score. The range of this score is [0, 1], where 1 indicates an exact match in the viral sequences.

For intracellular processing, an evidence component predicts the likelihood (a score in the range [0, 1]) that a particular epitope will undergo intracellular processing (proteasome cleavage, TAP binding and transport) and be available for presentation by the respective HLA molecule. Gradient-boosted trees are trained to predict this; they use the same input for each epitope as for predicting the T-cell response, as well as the pseudosequence of the respective HLA molecule. The model is trained using "positives" based on public mass spectrometry data, and the "negatives" for training and testing are also based on available public data.

The evidence components are preferably weighted. The weightage, or relative importance of each evidence component, for each of each component is determined using public ex vivo T-cell response data. In particular, the above values are calculated for each epitope which has been tested in an ex vivo experiment. Then, a linear model is trained to predict the observed T-cell response. The learned coefficients in the linear model are taken as the weights for each component.

Finally in step S3, the final ranking of epitopes is based on three elements: the score combination component (which is the weighted combination of the evidence components described above), an epitope embedding component (location in a multidimensional space) and an epitope ranking component which combine the score and location.

A single score for each candidate epitope is calculated by combining the scores from all evidence components. One significant advantage of the system according to an embodiment of the present invention derives from the use of the HLA binding affinity dataset. The single score is calculated as the weighted sum of all components described above, or different combinations of evidence components used in other embodiments.

The epitope embedding component in this embodiment can be similar to the epitope embedding component discussed in the embodiments above. A "location" is computed for each epitope within an embedding space. As a simple example, one can consider embedding a 9-mer in a 27-dimensional space based on the charge, polarity, and hydrophobicity of each amino acid in the epitope (9 amino acids*3 properties=27 dimensions). These embeddings are independent of the particular patient, and they can be thought of as representing "background knowledge" about the epitopes. For example, the EP algorithm described above can be used to learn the embedding locations. EP consists of two phases: an offline learning phase (which uses known experimental results), and an online embedding phase (in which the location for new candidate epitopes is determined). In the learning phase, EP takes as input a graph in which epitopes are connected based on sequence similarity, as well as all known properties of those epitopes (such as known HLA binding affinity data, presence in mass spectrometry data, but also information such as the gene ontology terms of the gene from which the epitope originates). EP then trains a neural network to map epitopes which are close in the graph and which have similar properties to locations which are close in the embedding space. Again, this is done in an offline learning phase and does not use information about candidate epitopes. In the online embedding phase, the location of each candidate epitope is determined. First, for each candidate epitope, its neighbors in the training graph are determined based on sequence similarity. Then, the trained neural network is used to determine the location of the candidate epitope in the embedding space.

The candidate epitopes are ranked based on their patient-specific score (from a score combination component implemented as discussed above) above and "diversity". The goal is to rank the epitopes such that the high-ranking epitopes are both likely to induce an immune response and are diverse. Further, the ranking is designed to remain diverse in case some of the top-ranked epitopes cannot be used due to synthesis, etc., issues. First, a patient-specific location is determined for each candidate epitope by multiplying the score of each candidate epitope by its location. So, for example, all candidate epitopes with a score close to 0 will be close together while candidate epitopes with large scores will be far apart. Then, an iterative process is used to rank the epitopes. The candidate epitope with the highest score is selected as the top-ranked epitope. The candidate epitope which is the farthest from the top-ranked epitope is then identified and taken as the second-ranked epitope. The third-ranked candidate epitope is the one which is farthest from both of the first two. This process continues, for example, until the top thirty candidate epitopes are ranked.

Advantageously, candidate epitopes with high scores but similar locations will have relatively low distance; thus, the procedure also encourages diversity. In other words, the method will select epitopes with large scores which are distant from each other in the embedding space.

To allow the presentation of neoepitopes identified as described above to a broad spectrum of immune response, neopeptides were designed in step S4 by extending the predicted 9-mer neoepitope from the mutation sites toward each direction and thus covering a 15-mer window. The resulting neopeptide depends on the type of mutation that led to the generation of an epitope. Various case scenarios are shown in FIG. 3. The overall rule for the design of neopeptides is then defined as an extension of a maximum of 14 residues upstream and downstream of the respectively first and last mutation position that is part of a predicted neoepitope.

In FIG. 3, M denotes a mutation, M1 denotes a first mutation in the epitope and Mn denotes a last mutation in the epitope (1<n≤9), A denotes a deletion event, SI denotes an inframe short insertion (1<m<9), LI denotes an inframe long insertion (>9) and FS denotes a frameshift. Epitope-driven detected mutations can't exceed a number of 9 (9-mer epitope).

In the design of the neopeptides fusions transfer sequence, the eligibility of the ranked neopeptides for being part of an expression cassette encoding for their fusion depends on various criteria that includes sequence homology and biochemical properties that might affect the generation of a recombinant vector, such as hydrophobicity and hydrophobic-related protein features like propensity to form transmembrane domains. A custom tool is used to design optimized expression cassettes based on the above-mentioned properties in step S5. The tool detects and discards any combination of neopeptides that might lead to an improper protein fusion. Any neopeptide candidate that already bears forbidden features or that induces highly hydrophobic fusion proteins is automatically disqualified and replaced, if any, by the next candidate in the initial list. The resulting expression cassettes are then embedded in a transfer sequence required for the plasmid generation.

Each neopeptide of the present invention can be synthesized using a technique known to those skilled in the art. For example, it may be artificially synthesized by a solid-phase method, such as the Fmoc method or the tBoc method, or a liquid-phase method. A desired peptide may also be produced by expressing a polynucleotide encoding the neopeptide of the present invention or a recombinant vector containing the polynucleotide. The neopeptides thus obtained can each be verified using a technique known to those skilled in the art. For example, it can be verified using the Edman degradation method or a mass spectrometry method.

Briefly, synthesis of a peptide by using solid phase synthesis method involves initially attaching the protected C-terminal amino acid of the peptide to the resin. After attachment the resin is filtered, washed and the protecting group (e.g. t-butyloxycarbonyl) on the alpha amino group of the C-terminal amino acid is removed. The removal of this protecting group must take place, of course, without breaking the bond between that amino acid and the resin. To the resulting resin peptide is then coupled the penultimate C-terminal protected amino acid. This coupling takes place by the formation of an amide bond between the free carboxy group of the second amino acid and the amino group of the first amino acid attached to the resin. This sequence of events is repeated with successive amino acids until all amino acids of the peptide are attached to the resin. Finally, the protected peptide is cleaved from the resin and the protecting groups removed to obtain the desired peptide. The cleavage techniques used to separate the peptide from the resin and to remove the protecting groups depend upon the selection of resin and protecting groups and are known to those familiar with the art of peptide synthesis.

According to one embodiment, neopeptides are obtained by the process of execution of the method according to any of the embodiments described above and a process of producing neopeptides identified by the execution of the method.

While there are other ways of determining epitopes to target, these all have significant drawbacks and do not provide the improvements discussed above. For example, all possible epitopes could be experimentally verified, obviating the need for ranking. However, this is prohibitive both in terms of time and cost, and therefore is not a viable solution. As another example, a set of epitopes could be computationally selected based on a set of hard filters. However, the filters would need to be designed by hand, and it would not be clear how to handle cases when many epitopes pass all filters, or when none do. As a further example, a set of epitopes could be selected by hand by an expert. However, it has been observed in the literature, for example, Jurtz, V., "NetMHCpan-4.0: Improved Peptide—MHC Class I Interaction Predictions Integrating Eluted Ligand and Peptide Binding Affinity Data," Journal of Immunology, 199, 3360-3368 (2017), which is hereby incorporated by reference herein in its entirety, that identifying epitopes likely to bind to HLA molecules is not straightforward, and that selecting epitopes which not only bind to the HLA molecules, but activate the entire endogenous or exogenous processing pathways would be even more difficult. Thus, such an approach is likely to result in many false positives. Further, some tumor samples result in thousands of epitope candidates such that manual ranking or selection in these cases is not practical. Epitopes could also be ranked solely based on their predicted HLA binding affinity. However, it has been reported by Gros, A., et al., "Prospective identification of neoantigen-specific lymphocytes in the peripheral blood of melanoma patients," Nature Medicine, 22, pp. 433-438 (2016) that many epitopes which have high predicted HLA binding affinity fail to elicit an immune response. Thus, such an approach is likely to result in many false positives.

In any of the embodiments described herein, the ranked candidate epitopes are preferably used in the treatment of the particular patient by targeting the epitopes according to their ranking in the immunotherapy.

As such, in a further embodiment, the present invention provides use of a neopeptide identified by the execution of the method of ranking epitopes according to any of the embodiments described herein, for the preparation of a pharmaceutical composition for the treatment of cancer and, in one or more embodiments, also to pharmaceutical compositions.

A pharmaceutical composition for treating or preventing cancer according to one or more embodiments of the present invention contains, as an active ingredient, at least one neopeptide of the present invention. The neopeptide of the present invention induces a cytotoxic T-lymphocyte (CTL) by being presented on an antigen-presenting cell, and the induced CTL injures a cancer cell. Thus, the active ingredient of the pharmaceutical composition of the present invention is not limited to the neopeptide of the present invention, but may also be a component capable of direct or indirect neopeptide-specific induction of the CTL, for example, the active ingredient may also be a polynucleotide encoding the neopeptide or a vector containing such a polynucleotide, or an mRNA encoding the neopeptide or an antigen-presenting cell presenting a complex of the neopeptide and an HLA molecule on the surface or an exosome secreted from the antigen-presenting cell, or a combination thereof. Examples of the antigen-presenting cell used include a macrophage and a dendritic cell; however, it is preferable to use the dendritic cell, which has a high CTL-inducing capability. Any of other ingredients known to be used for cancer therapy, such as a chemokine, a cytokine, a tumor necrosis factor, and a chemotherapeutic agent, may be contained in the pharmaceutical composition of the present invention.

A pharmaceutical composition of the present invention is thought to be useful for the killing of cancer cells by, for example, but not intended to be limited to, the following action mechanism. As such, a pharmaceutical composition for use in the treatment of cancer, wherein the pharmaceutical composition comprises a neopeptide identified by the execution of the method of ranking epitopes according to any of the embodiments described herein is disclosed. The administration of the pharmaceutical composition of the present invention to a particular cancer patient results in that the neopeptide in the pharmaceutical composition is presented in a state in which it is bound to an HLA molecule on the antigen-presenting cell surface. On recognizing the neopeptide on such an antigen-presenting cell, CTL is activated, proliferated, and systemically circulated. When the neopeptide-specific CTL enters cancer tissue, it recognizes the same neopeptide derived from a specific cancer antigen, naturally binding to an HLA molecule present on the cancer cell surface to kill the cancer cell. Such an action contributes to the cancer treatment. As such, in a further embodiment the present invention relates to a method of treating cancer in a subject in need thereof.

The pharmaceutical composition of the present invention can be used not only for treating cancer but also for preventing cancer. For example, the administration of the pharmaceutical composition of the present invention into a healthy human body induces CTL, and the induced cytotoxic T cell stay in the body and thus, when a particular cancer cell occurs, can injure the cancer cell. Similarly, the composition may be administered into a human body after treating cancer to prevent the recurrence of the cancer. In both such instances, the pharmaceutical composition is a vaccine composition.

In the specification, the term "cancer" is used in the broadest sense thereof. Examples of the cancer include, but are not limited to, astrocytoma, oligodendroglioma, meningioma, neurofibroma, glioblastoma, ependymoma, neurilemmoma, neurofibrosarcoma, neuroblastoma, pituitary tumor (for example, for pituitary adenoma), medulloblastoma, melanoma, brain tumor, prostate cancer, head and neck cancer, esophageal cancer, renal cancer, renal cell carcinoma, pancreatic cancer, breast cancer, lung cancer, colon cancer, colorectal cancer, stomach cancer, skin cancer, ovarian cancer, bladder cancer, fibrosarcoma, squamous cell carcinoma, neuroectodermal tumor, thyroid tumor, lymphoma, leukemia, multiple myeloma, hepatocellular carcinoma, mesothelioma and epidermoid carcinoma.

The pharmaceutical composition of the present invention can be dissolved in an aqueous solvent, formulated in the form of a pharmaceutically acceptable salt, and administered to patients. Examples of the form of such a pharmaceutically acceptable salt include a form buffered at physiological pH in the form of a physiologically acceptable water-soluble salt, for example, a salt of sodium, potassium, magnesium, or calcium. In addition to the water-soluble solvent, a non-water-soluble solvent may also be used; examples of such a non-water-soluble solvent include alcohols, such as ethanol and propylene glycol.

The formulation containing the pharmaceutical composition of the present embodiment may contain agents for various purposes; examples of such agents include a preservative and a buffer agent. Examples of the preservative include sodium bisulfite, sodium bisulfate, sodium thiosulfate, benzalkonium chloride, chlorobutanol, thimerosal, phenylmercuric acetate, phenylmercuric nitrate, methylparaben, polyvinyl alcohol, phenylethyl alcohol, ammonia, dithiothreitol, and beta-mercaptoethanol. Examples of the buffer agent include sodium carbonate, sodium borate, sodium phosphate, sodium acetate, and sodium bicarbonate. These agents can be present in an amount capable of maintaining the pH of a system at 2 to 9, preferably 4 to 8.

The dosage form of the pharmaceutical composition of the present invention is not particularly limited; however, when it is used in the form of a vaccine, examples of its dosage form include injections (intramuscular, subcutaneous, and intracutaneous), oral formulations, and nasal drop formulations. When the pharmaceutical composition of the present invention is in the form of a vaccine, it may be a mixed cocktail vaccine containing a plurality of active ingredients. For example, such a vaccine can contain any two or more of the neopeptides of the present invention, or contain a plurality of active ingredients by combination with other active ingredients.

The vaccine of the present invention may be an inert ingredient-containing vaccine containing an ingredient which is an ingredient other than the pharmaceutical composition, has no activity per se, and has the effect of further enhancing the effect of the pharmaceutical composition as a vaccine. Examples of the inert ingredient include an adjuvant and a toxoid. Examples of the adjuvant include, but not intended to be limited to, precipitation type ones, such as aluminium hydroxide, aluminium phosphate, and calcium phosphate, and oily type ones, such as Freund's complete adjuvant and Freund's incomplete adjuvant.

When present in the form of a vaccine, the pharmaceutical composition of the present invention is preferably administered into the body orally, or by injection or infusion, such as intracutaneous, subcutaneous, or intramuscular administration, or by dermal administration or inhalation through the mucosa of the nose, pharynx, or the like. Its single dose can be set to between a dose capable of significantly inducing cytotoxic T cells and a dose at which a significant number of non-cancer cells experience injury.

The pharmaceutical composition of the present invention is contemplated for not only administration to a human body but also extracorporeal use. More specifically, the pharmaceutical composition of the present invention may be used for the purpose of stimulating an antigen-presenting cell in vitro or ex vivo to increase its CTL-inducing activity. For example, in a case where the pharmaceutical composition of the present invention is used for dendritic cell therapy for cancer, the composition can be contacted with antigen-presenting cells, such as dendritic cells, derived from a patient in need of cancer treatment or prevention in advance, followed by administering the antigen-presenting cells to the patient by returning them into the patient's body. The peptide contained in the pharmaceutical composition can be introduced into an antigen-presenting cell, for example, by a lipofection method or an injection method. When a polynucleotide encoding the peptide of the present invention is used in such an application, the polynucleotide can be introduced into an antigen-presenting cell by a technique known in the art. For example, an antigen-presenting cell derived from a patient may be transformed in vitro using a polynucleotide of interest or a vector encoding the polynucleotide by a lipofection method, an electroporation method, a microinjection method, a cell fusion method, a DEAE dextran method, a calcium phosphate method, or the like.

The present invention includes a method for treating cancer by administering a medicine according to the present invention in a therapeutically effective dose. The therapeutically effective dose can be appropriately determined by those skilled in the art depending upon e.g., the symptoms, age, sex, body weight and sensitivity difference of the patient, the administration method, the administration interval and type of preparation.

The neopeptide of the present invention is contemplated for not only administration to a human body but also extracorporeal use. More specifically, the neopeptide of the present invention may be used for the purpose of stimulating an antigen-presenting cell in vitro or ex vivo to increase its CTL-inducing activity. For example, in a case where neopeptide of the present invention is used for dendritic cell therapy, the neopeptide can be contacted with antigen-presenting cells, such as dendritic cells, derived from a patient in need of immunity induction in advance, followed by administering the antigen-presenting cells to the patient by returning them into the patient's body. The neopeptide can be introduced into an antigen-presenting cell, for example, by transfection via a liposome (a lipofection method) or an injection method. When a polynucleotide encoding the neopeptide of the present invention is used in such an application, the polynucleotide can be introduced into an antigen-presenting cell by a technique known in the art. For example, an antigen-presenting cell derived from a patient may be transformed in vitro using a polynucleotide of interest or a vector expressing the polynucleotide by a lipofection method, an electroporation method, a microinjection method, a cell fusion method, a DEAE dextran method, a calcium phosphate method, or the like.

As used herein, "immunity induction" means inducing an immune response, for example, increasing the CTL-inducing activity of an antigen-presenting cell, and further increasing the cytotoxic activity of CTL against a cancer cell. As used herein, "CTL induction" means inducing or proliferating CTL specifically recognizing a certain antigen, or differentiating a naive T cell into an effector cell having the ability to kill a target cell (cytotoxic activity), such as a cancer cell, and/or increasing the cytotoxic activity of CTL by the presentation of the peptide of the present invention on the antigen-presenting cell surface in vitro or in vivo.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method of ranking candidate epitopes derived from neoantigens as targets for personalized immunotherapy, the method comprising:
   extracting experimentally-verified properties of epitopes and domain knowledge about the epitopes;
   embedding each of the epitopes in a vector space based on the experimentally-verified properties and the domain knowledge;
   collecting candidate epitopes based on patient data of a cancer patient;
   calculating a set of scores for each of the candidate epitopes, each score in a respective one of the sets for a respective one of the candidate epitopes representing an independent measure of a likelihood of the respective one of candidate epitopes to elicit an immune response in the cancer patient,
   wherein each of the sets of scores includes at least a first score indicating a likelihood of human leukocyte antigen (HLA) binding which is determined using HLA alleles which are specific to the cancer patient, and a second score indicating a T-cell response which is predicted using a T-cell receptor (TCR) repertoire which is identified using healthy ribonucleic acid (RNA) sequence data specific to the cancer patient;
   combining the scores in each of the sets of scores into a single score for each of the candidate epitopes, the single scores for the candidate epitopes in each case reflecting an overall likelihood of eliciting the immune response in the patient;
   ranking the candidate epitopes using the single scores and the embeddings for the immunotherapy, wherein the ranking is performed in an order of largest weighted distances in the vector space, the weighted distances in each case being determined based on Euclidean distances in the vector space multiplied by the single score for each respective one of the candidate epitopes such that one of the candidate epitopes with a largest weighted distance from an origin of the vector space is ranked first followed by one of the candidate epitopes having a largest weighted difference from the top-ranked epitope;
   producing a neopeptide, a polynucleotide encoding the neopeptide, a vector containing the polynucleotide encoding the neopeptide, a messenger ribonucleic acid (mRNA) encoding the neopeptide, an antigen-presenting cell presenting a complex of the neopeptide and a human leukocyte antigen (HLA) molecule on the surface, an exosome secreted from the antigen-presenting cell, or a combination thereof,
   wherein the neopeptide comprises at least one of the ranked candidate epitopes.

2. The method according to claim 1, wherein each of the sets of scores further comprises a third score based on tumor RNA-sequence data specific to the cancer patient.

3. The method according to claim 1, wherein the embedding is performed using a representation learning embedding framework which uses an affinity graph in which nodes represent the epitopes and edges connect the epitopes which have a similarity measure above a predefined threshold, wherein attributes of the nodes include at least the experimentally-derived properties and the domain knowledge, and wherein an embedding function is learned for each of the attributes to map the attributes to numeric vectors.

4. The method according to claim 1, wherein the embedding is performed by direct embedding in which at least the experimentally-derived properties and the domain knowledge are each embedded using numeric vectors which are concatenated together.

5. The method according to claim 1, wherein the embeddings include vector representations of biochemical properties of the epitopes.

6. The method according to claim 1, wherein the embeddings include vector representations of amino acid sequences of the epitopes.

* * * * *